June 23, 1959          M. LEE          2,891,439
CAMERA CORRELATION SYSTEM
Filed Jan. 17, 1955
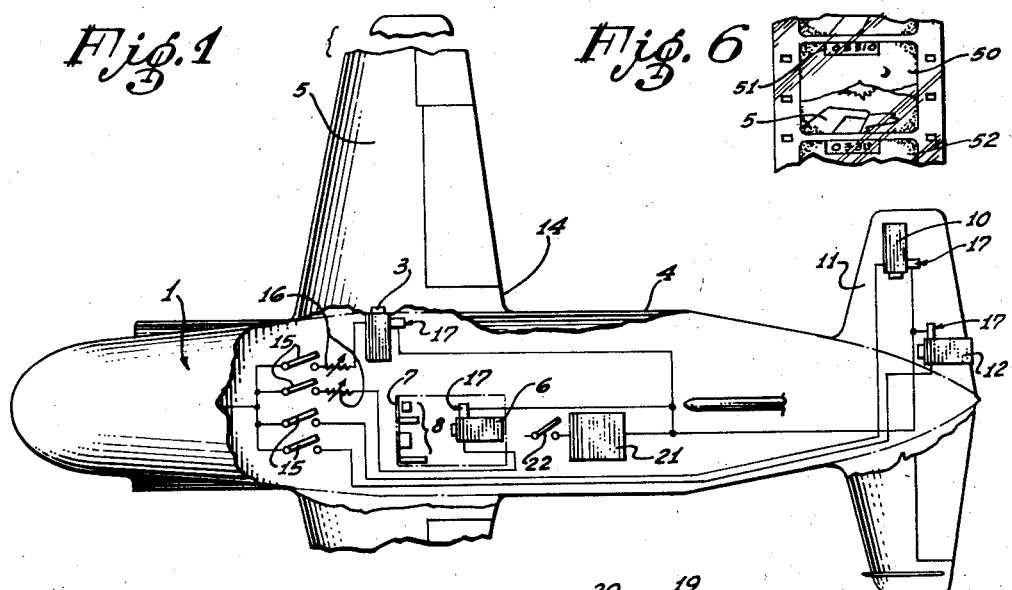
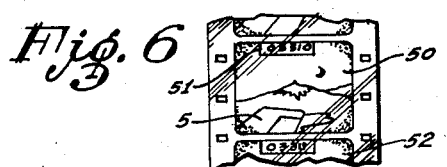
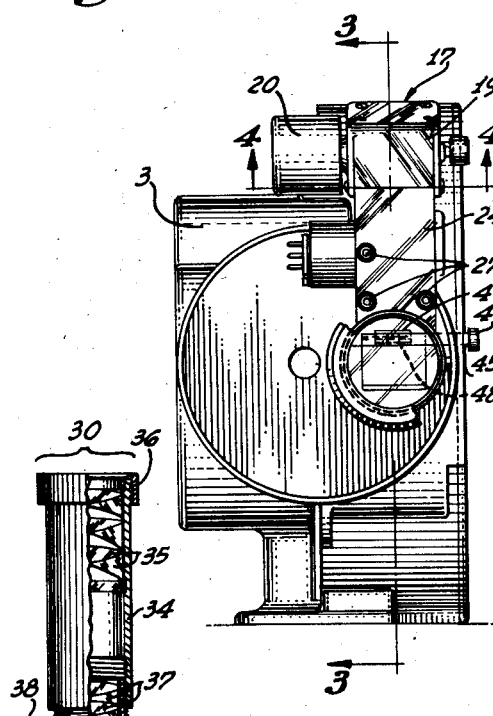
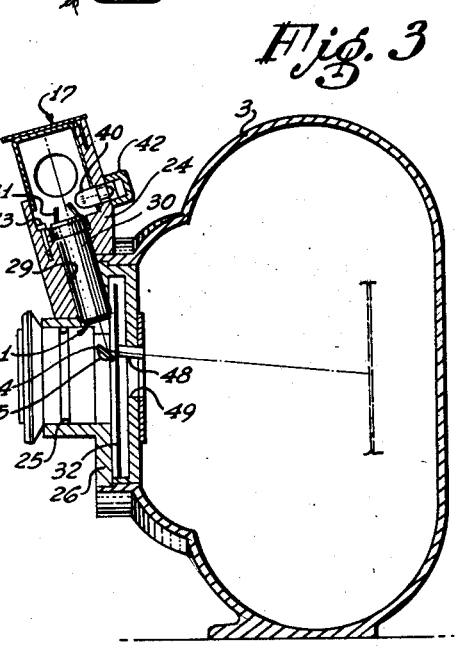
INVENTOR:
Mortimer Lee
By Herbert E. Metcalf
His Patent Attorney United States Patent Office 2,891,439
Patented June 23, 1959

2,891,439

CAMERA CORRELATION SYSTEM

Mortimer Lee, Lancaster, Calif., assignor to Northrop Corporation, a corporation of California Application January 17, 1955, Serial No. 482,198

1 Claim. (Cl. 88—16)

The present invention relates to a manner of making records of several simultaneous events, and more particularly, to a means for keeping an accurate time-wise account of conditions photographed by a plurality of cameras operating at different times or simultaneously during a test run of a device, so that the picture films produced can be accurately catalogued and presented according to the time of occurrence of the information in each film frame.

Various types of photographic work entail the simultaneous use of several cameras for the purpose of photographing different events which may occur simultaneously or in abrupt sequence. Some mechanical test laboratory work falls into this class. Another example of such use of cameras is in aircraft flight test activities.

In the latter case, for example, it is common practice to mount many motion picture cameras in different parts of the aircraft being tested, in order to observe the behavior of control surfaces, wings, or fuselage during test maneuvers. At the same time, a camera is usually mounted to photograph a panel containing a group of instruments which indicate accelerations, airspeed, altitude and the like, during the test maneuver. At the conclusion of the flight, the developed films are studied to determine the maneuver effects, and it is necessary to know accurately which frames of film, from different cameras, were exposed at the same time. Errors of correlation can make the entire data worthless and result in a lost flight.

It is an object of this invention to provide time-wise identification of every frame taken on all of the cameras, whether or not all cameras are continuously operated, without impairing normal camera operation or the normal camera optical system.

Briefly, as to method, my invention comprises establishing a continuous master time signal, and producing multiple remote outputs of this time signal on the films of a plurality of cameras, respectively, at the position occupied coincident with exposure thereof.

A preferred apparatus briefly comprises a counter mounted at each camera with illumniation and lens means for projecting an image of the counter number onto a small portion of each film frame when the camera is operated, the light path of the counter image preferably being inserted back of the camera lens and ahead of the shutter. All counters are driven by driving means which are operated in synchronism by signals from a single intervalometer operable at a predetermined constant speed, for example. Independent on-off control means are preferably used for each camera, and the frame speed rate of each camera may be variable as desired.

This invention will be more fully understood from the accompanying drawings and the detailed description of specific apparatus to follow.

In the drawings, which are shown by way of illustration and not limitation:

Figure 1 is a diagrammatic plan view of an airplane showing how the overall principle of the present invention is applied to a certain grouping of four cameras.

Figure 2 is a front view of a modified camera showing a typical correlation unit mounted thereon.

Figure 3 is a cross section of the same camera taken as indicated by the line 3—3 in Figure 2.

Figure 4 is a face view of a counter and driving solenoid assembly forming part of the correlation unit, viewed from the approximate position indicated by line 4—4 in Figure 2.

Figure 5 is a side view, partly in longitudinal section, of a counter lens assembly, showing the parts thereof.

Figure 6 is a face view of a partial simulated exposed film strip obtained by the present system, showing a typical location of the identification number thereon.

Referring first to Figure 1, the present invention is used in an airplane 1 wherein four electrically operated motion picture cameras are shown installed for flight testing purposes. A wing camera 3 is mounted in the fuselage 4 and points outboard along the wing 5. An instrument camera 6 is mounted inside the airplane to photograph a flight test instrument panel 7 having a plurality of various types of indicating instruments 8. A stabilizer camera 10 is mounted on the outer end of the horizontal stabilizer 11 to point inwardly, and a fuselage camera 12 is mounted to point forwardly along the outer side of the fuselage 4 and to the wing trailing edge 14.

Each camera is controlled independently by camera switches 15, one for each camera, which are used at will, to record information at desired times or continually during the flight. Variable speed control means such as rheostats 16 may be used to control the film speed, or cine rate, of the connected camera.

At each camera location is also included a correlation unit 17 comprising a counter 19 and a solenoid assembly 20, as shown in Figure 4, plus optical means. These units 17 are preferably mounted directly on their respective cameras, as will be described in detail later. The correlation units 17 are wired in parallel to the output of a time signal producing means, such as an intervalometer 21, carried in the airplane 1. An intervalometer switch 22 starts its operation, which generates a continuous train of pulses simultaneously fed to all solenoids 20. With the solenoids driving the counters 19, the counters are thus operated in exact synchronism and if all are started from the same number, they will indicate the same number at all times, though increasing at a rate determined by the intervalometer 21. This intervalometer operation is well known, and detailed structure need not be described herein. The solenoid assemblies 20 may each comprise a conventional type of rotary ratchet, forming a stepper motor. The counters 19 may be five-digit decimal counters.

Referring now to Figures 2 and 3, the correlation unit 17 for use at each camera 3, 6, 10, and 12 is attached to a mounting block 24 which is fastened to the camera near the junction of the lens tube 25 and shutter assembly 26, by cap screws 27. Inside the mounting block 24 is a bore 29 containing a lens assembly 30 which establishes an optical path from the number window of the counter 19 through a hole 31 in the camera front just ahead of the shutter 32.

Lens assembly 30 is shown by itself in Figure 5. It comprises a main tube 34 having a series of upper lenses 35 fixed in place by a cap 36, and a series of lower lenses 37 held in a focusing tube 38 which is threadably engaged inside the main tube 34. Therefore, the focus of lens assembly 30 can be adjusted by turning the focusing tube 38, since it projects from the lower end of main tube 34.

A lamp 40, light shield 41, cover 42, and associated wiring (not shown) are provided in the mounting block 24 to furnish illumination for projecting the counter number onto the film being exposed. The lens assembly 30 and light shield 41 are held in the mounting block 24 by a retaining screw 43.

Light from the counter 19 through lens assembly 30 is reflected back into the camera by a narrow mirror 44 secured to a flattened side of a bolt 45. The bolt 45 is installed laterally through the front part of the camera shutter assembly 26 and can be rotatably adjusted and locked by any suitable means 46 to position the counter image along the desired edge of the film frame. This will depend upon what position, around the periphery of the camera lens tube 25, is chosen to install the mounting block 24. In this particular embodiment, the mirror 44 is separate from the mounting block 24, the former being held by the camera. Mirror 44 is definitely a component of the correlation unit 17, however, and could be attached directly to an extended part of mounting block 24 in other installations, without going beyond the scope of the present invention.

A special frame shield 48 in the form of an inclined channel is provided at one side of the camera aperture 49 to limit the field of the counter optical system and to prevent light from the normal camera optical system from appearing on the film space where the counter number appears.

A typical resulting film frame 50 appears as shown in Figure 6, which might be a 35 mm. film, for example. The photographed scene will occupy the entire frame except for a counter number in a fixed small area 51 at one edge. The next frame 52 shows the next higher counter number, although this will not always be the case. For example, camera film speed might be 16 frames per second while the intervalometer and counter rate might be four counts per second. This would be sufficiently close correlation for many purposes, wherein an average of four successive frames would bear the same counter number.

To review the normal operation of the herein described system, all the counters 19 are first set at zero, and at a convenient starting point, the intervalometer is started by closing intervalometer switch 22, and the counters are actuated by intervalometer pulses. A counting rate is thus established and time can now be measured from the starting point by operating a camera to film the counter number. Since the counter reads a measure of elapsed time, the number tells exactly when each frame was taken. Moreover, it is evident that any two frames of film from different cameras which bear the same number were taken at the same time.

It is thus seen that simple and accuarte camera correlation is achieved. Several advantages of this system are now summarized. Since operation of the correlation units 17 is independent of their associated camera, any camera can be left inoperative during any period of time when no pertinent action is taking place, and no loss of correlation occurs due to the time-out period. Each camera may be run at any frame rate best suited to the action being observed. Since there are separate optical systems for the main camera field and the correlation counter field, and since the counter is independently illuminated, the factors which determine exposure and focus of the main picture do not affect the photographing of the counter number on the film. Once the intervalometer is turned on, the system is entirely automatic.

By utilizing the principles of this invention, time correlation can be provided among cameras at remote locations, stationary or moving, by connecting them by wires or by radio to receive pulses from a central intervalometer.

It is to be noted that other forms of apparatus may be employed to perform the overall method and result in the same correlation function. For instance, the exposure of the film portion bearing the time signal could be accomplished by means located behind the camera shutter and switched into the intervalometer output each time the camera is started. Coded shapes of regularly spaced blips could be used along the sprocket side of the film as in sound film recording, if found necessary or desirable. However, it is felt that the apparatus disclosed and claimed herein is the simplest and most convenient structure.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

I claim:

In combination with a master timer and a plurality of cameras, a plurality of optical assemblies, one assembly on each camera, each assembly comprising a tube mounted at one end on a camera with said tube projecting into an opening in said camera from the side of the field of view thereof, an adjustable-focus lens assembly in said tube, time indicating means and a lamp mounted at the other end of said tube in position to direct light rays from said time indicating means through said lens assembly out through said one end of said tube, a narrow flat mirror mounted in said camera crosswise through the camera lens housing and between the outer objective lens and shutter of said camera, said mirror positioned opposite said one end of said tube to reflect said light rays to the film position in said camera, said lens assembly focusing an image of said time indicating means on a desired edge of the film frame in picture-taking position, all of said time indicating means being actuated in synchronism by said master timer, whereby all scenes photographed by said cameras will be exactly correlated as to time.

References Cited in the file of this patent

UNITED STATES PATENTS

| | | |
|---|---|---|
| 1,948,319 | Spence | Feb. 20, 1934 |
| 1,950,091 | Owens | Mar. 6, 1934 |
| 2,169,011 | Wengel | Aug. 8, 1939 |
| 2,250,442 | Abell | July 29, 1941 |
| 2,378,182 | Burrell | June 12, 1945 |
| 2,683,071 | Pearle | July 6, 1954 |

FOREIGN PATENTS

| | | |
|---|---|---|
| 565,672 | France | Nov. 9, 1923 |